Jan. 19, 1937.    G. F. SHOTTER    2,068,116
APPARATUS FOR TRANSMITTING MOVEMENTS TO A DISTANCE
Filed July 26, 1933
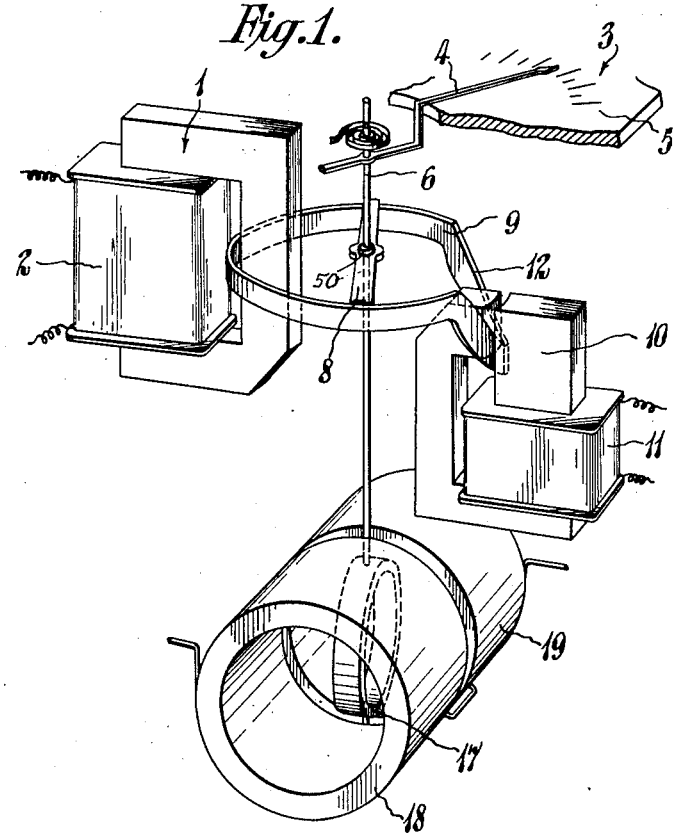
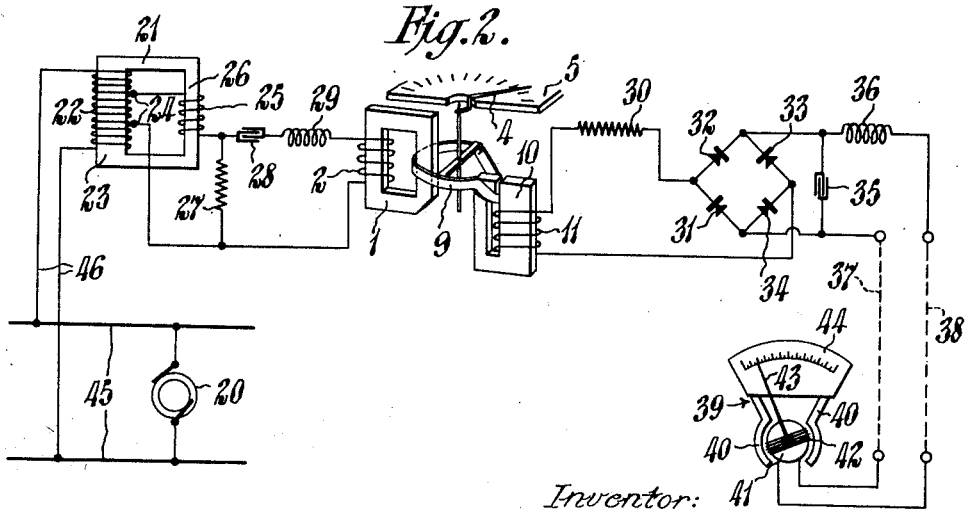
Inventor:
George Frederick Shotter Patented Jan. 19, 1937

2,068,116

UNITED STATES PATENT OFFICE 2,068,116

APPARATUS FOR TRANSMITTING MOVEMENTS TO A DISTANCE

George Frederick Shotter, Friern Barnet, London, England

Application July 26, 1933, Serial No. 682,183
In Great Britain August 5, 1932

9 Claims. (Cl. 177—351)

The present invention relates to apparatus for transmitting movements to a distance and has for its object an arrangement whereby the forces exerted by the transmitting elements on the device which is moving, which may be for instance the pointer of a measuring instrument, are negligible.

One of the features of the present invention concerns apparatus for producing an electrical effect to correspond with the position taken up by a movable member to enable such position to be transmitted to a distant point, without employing operating contacts in the movable member.

Another feature of the invention broadly stated relates to an arrangement whereby the magnetic coupling between two magnetic circuits is varied in accordance with the position taken up by the movable member. An alternating flux of constant magnitude is applied to one magnetic circuit, and, by varying the coupling between the two circuits, in accordance with the different positions taken up by the movable member, the flux induced in the second circuit is varied correspondingly.

A further feature of the invention relates to the provision of a constant supply of alternating current to an arrangement controlled in accordance with the position of the movable member whose motions are to be transmitted so that the arrangement in turn supplies alternating current of a voltage corresponding to the position of the member, such alternating current is rectified and the rectified current transmitted over a line to operate a measuring instrument the reading of the measuring instrument corresponding to the position of the movable member.

Other features of the invention not specifically referred to will be found by reference to the description hereinafter and to the accompanying drawing.

In the following description, which should be taken in conjunction with the accompanying drawing, one embodiment of the invention is described. In the drawing:

Fig. 1 shows a perspective view of the apparatus employed in transmitting the indications of a member whose position is liable to vary from time to time.

Fig. 2 shows the circuit connections for the apparatus of Fig. 1.

Referring now to Fig. 1, a closed core 1 of magnetic material is provided with a winding 2 to which is applied a constant alternating voltage. The member whose indications are to be transmitted is shown at 3, and comprises a pointer 4 moving over a scale 5. The pointer is attached to a shaft 6 at the lower end of which is attached a coil 17. This coil is mounted centrally between two coaxial energizing coils 18, 19, the whole forming the well-known dynamometer arrangement. Variation of current flow in the coil 17 causes it to take up different angular positions with respect to the energizing coils 18, 19, thereby causing the pointer 4 to move over the scale 5. Fixed to the shaft 6 connecting the pointer 4 with the coil 17 is a bridge piece 8, which carries a substantially circular conducting band 9, preferably of copper, the band being insulated from the bridge piece by a sleeve 50, formed of any suitable or preferred insulating material. This band embraces the magnetic core 1, and, is located in, under or over the air gap of a second magnetic core 10, according to its position. This second magnetic core is also provided with a coil 11 forming the output from the instrument. It will be understood that the input and output can be reversed, if desired.

That part of the copper band which is located in, under or over the air gap of the second magnetic core is shaped to dip down below the air gap as shown at 12, the main part of the band being above.

The operation of the apparatus is as follows: A constant alternating voltage is applied to the winding 2, causing an alternating magnetic flux to be induced in the core 1. This alternating flux induces current in the copper band 9. Further, since the copper band is located in the air gap of the second core, the induced currents flowing in the band 9 will give rise to an alternating flux in the second magnetic core 10, which will induce a current in the winding 11. It will be appreciated that the flux intensity in the second core will be dependent upon the position of the dip of the copper band in the air gap of this core. On the movement of the pointer, the copper band will be rotated, and, owing to the dip in the band, the effect of the band on the pole pieces of the core 10 will be varied, and hence the amount of energy transferred to the second core 10 and the output current from the coil 11, will be correspondingly varied.

Referring now to Fig. 2, this shows the circuit arrangements employed when using the apparatus illustrated in Fig. 1. The A. C. current for the winding 2 could be obtained from any suitable A. C. supply, which is represented for convenience by the A. C. generator 20, the busbars 45 and the conductors 46. It will be appreciated that it is essential that the alternating voltage applied to the winding 2 should be of substantially constant magnitude. For this purpose, an auto-transformer is located between the alternating voltage source 20 and the winding 2, and comprises a rectangular core 21 having a winding 22 wound on the limb 23. The output from the auto-transformer is taken from the points 24, and in one side of the output circuit is arranged a balancing winding 25 wound on the limb 26 of the core 21. This balancing coil is inserted for the purpose of maintaining constant the alternating voltage in the output circuit. The limb 26 is made with a smaller cross-sectional area than the limb 23, and is of such dimensions that it is saturated over the working range of the instrument. Further, the windings 22 and 25 are connected in such a manner that the electromotive force induced across the terminals of the winding 25 is in oppositon to the electromotive force across the terminals of the winding 22 and exceeds it by the electromotive force required for the output circuit. It will be appreciated that with a sufficiently strong magnetizing force on the limb 23 the limb 26 will become saturated, so that variations of magnetizing force will have a reduced effect on the winding 25. At the same time the electromotive force across the winding 24 will be increased at a uniform rate with the result that the electromotive force across the resistance 27 will be substantially constant over quite a wide variation of potential of the A. C. source.

A resistance 27 is inserted across the output circuit of the auto-transformer to provide a substantially constant load, and so prevent any appreciable variation of load due to the different positions of the pointer. The output circuit is connected to the coil 2 through a condenser 28, and an inductance 29, connected in series. The purpose of the condenser 28 and inductance 29 will now be explained. The auto-transformer is so designed that the mean value as well as the root mean square value of the output voltage is substantially constant. Under this condition the output voltage is not of sine form, that is to say, it includes currents of frequencies which are a multiple of the fundamental frequency, i. e. harmonics. The magnetic core 1 with the coil 2 and band 9 constitutes a transformer of which it can be assumed that the current in the band 9 has the same wave shape as that in coil 2, whereas the magnetic core 10 with the band 9 and coil 11 constitute a transformer which is nearly equivalent to a quadrature transformer. The condenser 28 is used to compensate for changes in the fundamental frequency only, the reactance being the predominant impedance, the value of condensance and impedance being so chosen that an exact compensation is made for the increased reading which would be obtained for the same change of fundamental frequency. The inductance 29 offers a much greater impedance to the high frequency harmonics than to the fundamental frequency while on the other hand the second element (10, 9 and 11) of the transmitter due to its resembling a quadrature transformer enables the high frequency harmonics to be transmitted with greater relative efficiency than the fundamental frequency. In consequence the tendency is for the electromotive force produced at the terminals of coil 11 to have the same wave form as the electromotive force at the output terminals of the saturated transformer. If ohmic resistance were substituted for the reactance, it would appear, as has been confirmed by practical tests, that the form of electromotive force wave at the output side would be distorted due to the magnification of the harmonic elements.

The output from the auto-transformer is then connected to the coil 2 on the magnetic core 1. The operation of this part of the system which is, of course, identical with that shown in Fig. 1, will not be further explained.

The output from the coil 11 is applied to a rectifying arrangement over a series resistance 30. The rectifying arrangement comprises four dry rectifiers 31, 32, 33 and 34, arranged in the well known bridge formation to give full-wave rectification. A condenser 35 is connected across the output conductors of the rectifier bridge, while an inductance 36 is connected in series with one of the output conductors. The condenser 35 and inductance 36 form a smoothing circuit for the direct current output of the rectifier. The two output conductors are then connected to the line conductors 37 and 38 leading to the distant station, where they are connected to any suitable form of direct current measuring instrument. In the figure, a direct current ammeter 39 of the well known type is shown. This ammeter comprises a permanent magnet 40 with a soft iron core 41 located between the pole pieces of the permanent magnet. On the core is mounted a coil 42 to which the current incoming over the line is fed. A pointer 43 is attached to the coil 42, and moves over a scale 44, the deflection of the pointer 43 being proportional to the current flowing in the coil 42. By suitable calibration of the instrument the position taken up by the pointer 43 can be made to correspond exactly with the position of the pointer 4 so that it is possible at the distant station to have an indication continuously available of the position of a device.

It will be appreciated that the above description is by way of example only, and many modifications may be made which are still within the scope of the invention. For instance, the instrument whose indications are to be transmitted is shown in Fig. 1 as an electric dynamometer but it is obvious that the invention is not limited to the use thereof.

Further, it is not essential that the means for linking two magnetic circuits should be a copper band as it is possible by means of a copper disc or plate to link two magnetic circuits, current being induced into the copper disc by one magnetic circuit and the current induced in the disc being arranged to induce flux into another magnetic circuit by an amount which is dependent upon the position of the copper disc.

One advantage of the arrangements described is that there is little or no reaction on the pointer so that the addition of the copper band 9 can have no appreciable effect on the reading. In the event of the alternative described immediately above there may be reaction and it is accordingly necessary to arrange means for compensating for this.

I claim:

1. A device for producing an alternating magnetic flux of such value as to correspond with the position taken up by a movable member comprising a magnetic circuit, a second magnetic circuit, said circuits being disposed in non-inductive relationship with respect to each other, means for exciting said first magnetic circuit with alternating magnetic flux of constant magnitude, a closed circuited conducting member embracing both magnetic circuits and providing the sole inductive link between said two magnetic circuits to cause a flow of current to be induced by said first magnetic circuit in said closed-circuited conducting member which in turn induces a magnetic flux in said second magnetic circuit, and means supporting and mechanically connecting said conducting member and said movable member together for joint movement, said conducting member being of asymmetrical configuration whereby movement of said conducting member in accordance with the movement of the movable member will cause the amount of flux produced by the said first magnetic circuit in the second magnetic circuit to vary.

2. A device for producing an electrical effect to correspond with the position taken up by a movable member comprising a magnetic circuit, a second magnetic circuit, said circuits being disposed in non-inductive relationship with respect to each other, means for exciting said first magnetic circuit with alternating magnetic flux of constant magnitude, a coil embracing said second magnetic circuit, a closed circuited conducting member embracing both magnetic circuits and providing the sole inductive link between two magnetic circuits to cause a flow of current to be induced by said first magnetic circuit in said closed-circuited conducting member which in turn induces a magnetic flux in said second magnetic circuit, and means supporting and mechanically connecting said conducting member and said movable member together for joint movement, said conducting member being of asymmetrical configuration whereby movement of said conducting member in accordance with the movement of the movable member will cause the amount of alternating flux produced by the first magnetic circuit in the second magnetic circuit to vary and thereby produce correspondingly varying electrical effects in said coil.

3. A device for producing an alternating magnetic flux of such value as to correspond with the position taken up by a movable member comprising a magnetic circuit, a second magnetic circuit, said circuits being disposed in non-inductive relationship with respect to each other, means for exciting said first magnetic circuit with alternating flux of constant magnitude, a conductor member shaped to form a closed circuited loop, said conductor member embracing both magnetic circuits and providing the sole inductive link between said two magnetic circuits to cause a flow of current to be induced by said first magnetic circuit in said closed-circuited loop which in turn induces a magnetic flux in said second magnetic circuit, and means supporting and mechanically connecting said conductor member and said movable member together for joint movement, said conductor member being of asymmetrical configuration whereby movement of said conductor member in accordance with the movement of the movable member will cause the amount of flux produced by the said first magnetic circuit in the second magnetic circuit to vary.

4. A device for producing an alternating magnetic flux of such value as to correspond with the position taken up by a movable member comprising a magnetic circuit, a second magnetic circuit, said circuits being disposed in non-inductive relationship with respect to each other, one of said circuits having an air gap, means for exciting one of said magnetic circuits with alternating flux of constant magnitude, a pivoted ring of conducting material forming a closed electrical circuit, said ring embracing both magnetic circuits and providing the sole inductive link between said two magnetic circuits to cause a flow of current to be induced by the one magnetic circuit in said pivoted ring which in turn induces a magnetic flux in the other magnetic circuit, and means supporting and mechanically connecting said ring and said movable member together for joint movement, said ring being of asymmetrical configuration whereby upon movement of said ring in accordance with the movement of the movable member it passes through the air gap in the one magnetic circuit to thereby cause the amount of flux induced therein to vary.

5. A device for producing an alternating magnetic flux of such value as to correspond with the position taken up by a movable member comprising a closed magnetic circuit, a second magnetic circuit having an air gap, said circuits being in non-inductive relationship with respect to each other, means for exciting said first magnetic circuit with alternating flux of constant magnitude, a pivoted ring of conducting material forming a closed electrical circuit, said ring embracing both magnetic circuits and providing the sole inductive link between said two magnetic circuits to cause a flow of current to be induced by said first magnetic circuit in said pivoted ring which in turn induces a magnetic flux in said second magnetic circuit, and means supporting and mechanically connecting said ring and said movable member together for joint movement, said pivoted ring being of asymmetrical configuration whereby upon movement of said ring in accordance with the movement of the movable member it passes across the air gap in said second magnetic circuit so as to cause the amount of flux induced in the said second magnetic circuit to vary.

6. An arrangement for producing an electrical effect at a distance to correspond with the position taken up by a movable member, comprising a source of alternating current of constant magnitude, means connected to said source and creating an alternating flux of constant magnitude, closed circuited, electrical conducting means of asymmetrical configuration disposed in the field of said flux and creating a second alternating flux, means supporting and mechanically connecting said electrical conducting means and said movable member together for joint movement, and a coil disposed in the field of said second alternating flux and having an alternating current induced therein by said second alterating flux of a magnitude dependent upon the position of said asymmetrical conducting means with respect to said coil.

7. An arrangement for producing an electrical effect at a distance to correspond with the position taken up by a movable member, comprising a source of alternating current of constant magnitude, an exciting coil connected to said source, a second coil, said coils being disposed in non-inductive relationship with respect to each other, and closed circuited electrical conducting means embracing the magnetic fields created by both said coils and providing the sole inductive link between said coils, said conducting means being of asymmetrical configuration and mechanically connected to said movable member for axial rotation therewith about a common axis and positionally controlled by said movable member to cause said exciting coil to induce an alternating current in said second coil of a magnitude dependent upon the position of the movable member.

8. An arrangement for producing an electrical effect at a distance to correspond with the position taken up by a movable member, comprising a source of alternating current, a magnetic circuit, an exciting coil for said magnetic circuit, means interposed between said source of alternating current and said exciting coil for maintaining constant the magnitude of the alternating potential across the terminals of said exciting coil, a second coil, said coils being disposed in non-inductive relationship with respect to each other, and closed circuited electrical conducting means embracing the magnetic fields created by both said coils and providing the sole inductive link between said coils, said conducting means being of asymmetrical configuration and mechanically connected to said movable member for axial rotation therewith about a common axis and positionally controlled by said movable member to cause said exciting coil to induce an alternating current in said second coil of a magnitude dependent upon the position of the movable member.

9. An arrangement for indicating at a distance the positions taken up by a pointer of a measuring instrument comprising a magnetic circuit, a second magnetic circuit, said circuits being disposed in non-inductive relationship with respect to each other, means for exciting said first magnetic circuit with alternating flux of constant magnitude, a coil embracing said second circuit, a closed circuited conducting member embracing both magnetic circuits and providing the sole inductive link between said two magnetic circuits to cause a flow of current to be induced by said first magnetic circuit in said closed circuited conducting member which in turn induces a magnetic flux in said second magnetic circuit and common means supporting and mechanically connecting said conducing member to said pointer for joint movement therewith; said conducting member being of asymmetrical configuration to cause the amount of flux produced by the first magnetic circuit in the second magnetic circuit to vary upon movement of the pointer and thereby produce correspondingly varying electrical effects in said coil.

GEORGE F. SHOTTER.